(12) United States Patent
Wan et al.

(10) Patent No.: US 9,838,150 B2
(45) Date of Patent: Dec. 5, 2017

(54) METHOD AND APPARATUS FOR DETECTING OPTICAL NETWORK UNIT, AND PASSIVE OPTICAL NETWORK SYSTEM

(71) Applicant: Huawei Technologies Co., LTD, Shenzhen (CN)

(72) Inventors: Min Wan, Shenzhen (CN); Xiaofei Zeng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 301 days.

(21) Appl. No.: 14/039,715

(22) Filed: Sep. 27, 2013

(65) Prior Publication Data
US 2014/0029947 A1   Jan. 30, 2014

Related U.S. Application Data

(63) Continuation of application No. PCT/CN2012/073243, filed on Mar. 29, 2012.

(30) Foreign Application Priority Data

Mar. 29, 2011   (CN) .......................... 2011 1 0077143

(51) Int. Cl.
*H04B 10/077* (2013.01)
*H04B 10/079* (2013.01)
*H04J 14/08* (2006.01)
*H04B 10/272* (2013.01)
(Continued)

(52) U.S. Cl.
CPC .......... *H04J 14/086* (2013.01); *H04B 10/077* (2013.01); *H04B 10/079* (2013.01); *H04B 10/272* (2013.01); *H04Q 11/0067* (2013.01); *H04J 14/0247* (2013.01); *H04J 14/0252* (2013.01); *H04J 14/0282* (2013.01);
(Continued)

(58) Field of Classification Search
CPC .......................... H04Q 2011/0081–2011/0083
See application file for complete search history.

(56) References Cited

U.S. PATENT DOCUMENTS

| 7,778,543 B2 | 8/2010 | Ferguson et al. |
| 2005/0265719 A1* | 12/2005 | Bernard .......................... 398/58 |
| 2006/0093356 A1 | 5/2006 | Vereen et al. |

(Continued)

FOREIGN PATENT DOCUMENTS

| CN | 101005317 A | 7/2007 |
| CN | 101621452 A | 1/2010 |

(Continued)

*Primary Examiner* — Nathan Curs
(74) *Attorney, Agent, or Firm* — Slater Matsil, LLP

(57) ABSTRACT

Embodiments of the present invention disclose a method and an apparatus for detecting an ONU, and a passive optical network system. The method includes detecting an identity code of an ONU in an open uplink empty window or an empty timeslot, and determining that an ONU corresponding to the identity code of the ONU is a rogue ONU according to the identity code of the ONU. A corresponding apparatus and passive optical network system are also provided in the embodiments of the present invention. In the passive optical network system, a rogue ONU is detected and determined quickly and efficiently, and an effect on an uplink service is reduced.

7 Claims, 3 Drawing Sheets

(51) Int. Cl.
  *H04Q 11/00* (2006.01)
  *H04J 14/02* (2006.01)
(52) U.S. Cl.
  CPC ............... *H04Q 2011/0081* (2013.01); *H04Q 2011/0083* (2013.01)

(56) References Cited

U.S. PATENT DOCUMENTS

| | | |
|---|---|---|
| 2009/0235354 A1 | 9/2009 | Gray et al. |
| 2011/0069955 A1 | 3/2011 | Hajduczenia et al. |
| 2011/0274426 A1 | 11/2011 | Yang |
| 2012/0008939 A1* | 1/2012 | Yang et al. .................... 398/17 |

FOREIGN PATENT DOCUMENTS

| | | | |
|---|---|---|---|
| CN | 101640821 A | 2/2010 | |
| CN | 101729938 A | 6/2010 | |
| CN | 101790111 A | 7/2010 | |
| CN | 101841738 A | 9/2010 | |
| CN | 101902447 A | 12/2010 | |
| CN | 102142897 A | 8/2011 | |
| CN | 102271293 A | 12/2011 | |
| EP | 1311137 A2 | 5/2003 | |
| EP | 2051413 A1 | 4/2009 | |
| JP | 2002217929 A | 8/2002 | |
| JP | 2004350002 A | 12/2004 | |
| JP | 2008042809 A | 2/2008 | |
| JP | 2009100426 A | 5/2009 | |
| JP | 2010539836 A | 12/2010 | |
| JP | 2012151737 A | 8/2012 | |
| KR | 20090036487 A | 4/2009 | |
| RU | 2390836 C2 | 5/2010 | |
| WO | 2005046138 A1 | 5/2005 | |
| WO | 2010038938 A1 | 4/2010 | |
| WO | WO 2010/105578 * | 9/2010 | ............ H04B 10/00 |
| WO | 2011153791 A1 | 12/2011 | |

* cited by examiner

METHOD AND APPARATUS FOR DETECTING OPTICAL NETWORK UNIT, AND PASSIVE OPTICAL NETWORK SYSTEM

This application is a continuation of International Patent Application No. PCT/CN2012/073243, filed on Mar. 29, 2012, which claims priority to Chinese Patent Application No. 201110077143.9, filed on Mar. 29, 2011, both of which are hereby incorporated herein by reference in their entireties.

TECHNICAL FIELD

The present invention relates to the field of communications, and in particular, to a method and apparatus for detecting an optical network unit, and a passive optical network system.

BACKGROUND

When a PON (passive optical network) is accessed, an OLT (optical line terminal) at a central office is corresponding to more than one ONU (optical network unit) or ONT (optical network terminal). Because an ONT may be regarded as a special ONU, the ONU is uniformly used in the following in this specification.

In a downlink direction, downlink information of the OLT is uniformly sent to all ONUs through a fixed downlink optical wavelength; and in an uplink direction, all ONUs emit light at a specific timeslot according to a rule of an uplink optical channel bandwidth of time division multiplexing. That is, the ONU emits uplink light according to a bandwidth allocation indication of the OLT. However, a rogue ONU is an ONU that emits light not according to the bandwidth allocation indication of the OLT.

There are many kinds of rogue ONUs. From the perspective of light emission time of rogue ONUs, rogue ONUs may be divided into: persistent-emission rogue ONUs: ONUs that emit light anytime; and non-persistent rogue ONUs: ONUs that emit light in a time segment that is not indicated by the OLT, namely, ONUs that may emit light beforehand or may be shut down in delay.

As regards whether a rogue ONU accepts control of an OLT, rogue ONUs may be divided into malicious rogue ONUs: rogue ONUs that do not respond to a control command of the OLT; and non-malicious rogue ONUs: rogue ONUs that respond to the control command of the OLT.

As regards whether a rogue ONU is pre-configured, rogue ONUs may be divided into pre-configured rogue ONUs: rogue ONUs that are added through a network management system or a command line and have worked properly, and are legal ONUs; and illegally accessing rogue ONUs: rogue ONUs that are not approved by an administrator and are newly accessing ONUs, and are also called rogue ONUs in an automatic discovery state.

Currently, at the time of detecting a rogue ONU, an OLT needs to open an uplink empty window first (namely, commands all ONUs not to emit light) to detect whether a rogue ONU exists. If a rogue ONU exists, the OLT instructs all ONUs to power off their own optical module, and then powers on an optical module of each ONU one by one and opens an uplink empty window for each ONU to separately detect and determine which ONU is a rogue ONU.

In the process of implementing the present invention, the inventor finds that the prior art has at least the following problems:

With the foregoing detection method, an uplink empty window needs to be opened for all ONUs one by one for detection, and detection efficiency is lower; and at the time of detection, transmission power supply of ONUs need to be shut down one by one, thus affecting an uplink service of an ONU.

SUMMARY OF THE INVENTION

The embodiments of the present invention aim to provide a method and apparatus for detecting an ONU, and a passive optical network system, so as to improve efficiency and accuracy of detecting a rogue ONU and reduce an effect on an uplink service.

An embodiment of the present invention provides a method for detecting an ONU, and the method includes detecting an identity code of an ONU in an open uplink empty window or an empty timeslot; and according to the identity code of the ONU, determining that an ONU corresponding to the identity code of the ONU is a rogue ONU.

An embodiment of the present invention further provides an ONU, and the ONU includes an optical module, where the optical module includes an obtaining unit, configured to obtain an identity code of an ONU and a sending unit, configured to send the identity code of the ONU, where the identity code of the ONU is obtained by the obtaining unit, so that an OLT can detect the identity code of the ONU in an open uplink empty window or an empty timeslot.

An embodiment of the present invention further provides an OLT, and the OLT includes a detecting module, configured to detect, in an open uplink empty window or an empty timeslot of the OLT, whether an identity code of an optical network unit (ONU) is received and a processing module, configured to, when the detecting module detects the identity code of the ONU, determine that an ONU corresponding to the identity code of the ONU is a rogue ONU.

An embodiment of the present invention further provides a passive optical network system, which includes an optical line terminal (OLT) and at least one optical network unit (ONU), where the optical network unit (ONU) includes an optical module.

The optical module is configured to obtain an identity code of an ONU, and send the identity code of the ONU.

The OLT is configured to receive the identity code of the ONU in an open uplink empty window or an empty timeslot, and according to the identity code of the ONU, determine that an ONU corresponding to the identity code of the ONU is a rogue ONU.

Through the ONU detection method, apparatus and system in the embodiments of the present invention, the identity code of the ONU is detected in the open uplink empty window or the empty timeslot; and according to the identity code of the ONU, the ONU corresponding to the identity code of the ONU is determined as a rogue ONU, so that a rogue ONU is detected and determined quickly and efficiently, and meanwhile, the effect on the uplink service is reduced.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the foregoing objectives, features and merits of the present invention clearer and more understandable, the embodiments of the present invention are described in further detail in the following with reference to the accompanying drawings and specific implementation manners.

An ONT may be regarded as a special ONU. Therefore, only an ONU is taken as an example for description in this application. Those skilled in the art may understand that any embodiment that is applicable to the ONU in this application is also applicable to the ONT.

Embodiment 1

Figure 1:
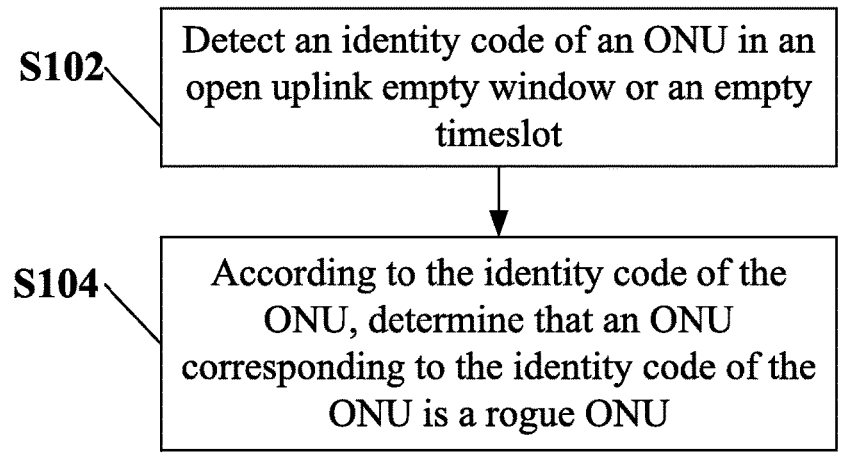
FIG. 1 is a schematic flowchart of a method for detecting an ONU according to an embodiment of the present invention.

This embodiment provides a method for detecting an ONU. As shown in FIG. 1, the method includes:

S102: An optical line terminal (OLT) detects an identity code of an optical network unit (ONU) in an open uplink empty window or an empty timeslot.

The identity code of the optical network unit (ONU) is pre-configured and sent by an optical module of the ONU; or, the identity code of the optical network unit (ONU) is obtained and sent by the optical module of the ONU from a control module of the ONU within unauthorized time.

The identity code of the ONU is a specific sequence optical channel code that identifies the ONU. The identity code of the ONU is configured by a system, and may also be a product code of the optical module. Specifically, the identity code of the ONU may be a specific sequence optical channel code that identifies the ONU (may also be called a specific code stream sequence of the ONU). The specific sequence optical channel code of the ONU may be formed by a delimiter plus a specific code. The specific code may be any one or a combination of an LLID (logic link identifier), an ONU ID (ONU identifier), an SN (sequence number), a MAC code, a product code of the optical module, and a unique identity that is allocated by the OLT to each ONU. ONUs connected with the same OLT have different identities for distinguishing each ONU.

S104: According to the identity code of the ONU, the OLT determines that an ONU corresponding to the identity code of the ONU is a rogue ONU.

The rogue ONU is a faulty ONU, that is, may be understood as an ONU that emits light not according to a bandwidth allocation indication of the OLT.

A process of obtaining the identity code of the optical network unit (ONU) in S102 is specifically described in the following.

The ONU in this embodiment includes a control module and an optical module. The control module may be an MAC module or an MAC chip.

After the ONU obtains the identity code of the ONU, once the optical module in the ONU is faulty and uncontrollable, the identity code of the ONU is sent. In this way, the OLT may detect the identity code of the ONU in the open uplink empty window or the empty timeslot, and therefore, judges that a rogue ONU exists, and may determine that the ONU corresponding to the identity code of the ONU is a rogue ONU. That is, the rogue ONU is detected accurately without affecting normal transmission of an uplink service. The optical module may obtain the identity code of the ONU in two ways:

(1) The optical module of the ONU obtains the identity code of the ONU from an MAC module (or an MAC chip) within unauthorized time.

When the optical module of the ONU is controlled by the MAC module, the MAC module generally controls a Tx_ENABLE enable signal and a data signal of the optical module, where TX_ENABLE means that the optical module is enabled to emit light, and the data signal refers to data that is sent onto an optical channel. If the MAC module sends a non-enable signal to the optical module, the optical module still emits light in an uplink direction when a control signal TX_ENABLE of the optical module has a low level, namely, when the signal is a non-enable signal (when the control signal of the ONU is a non-enable signal, a time period in which the ONU is in a non-enable state may be regarded as "unauthorized time"). At this time, the MAC module sends the identity code of the ONU to the optical module, so that the OLT can detect the identity code of the ONU in the open uplink empty window or the empty timeslot, and therefore, determines that the ONU corresponding to the identity code of the ONU is a rogue ONU.

(2) The optical module of the ONU obtains the identity code of the ONU from the optical module of the ONU.

When the MAC module of the ONU controls the optical module to emit light, if the MAC module does not input a signal but the optical module is emitting light at this time, the optical module emits light independently without external control. In this case, the optical module may extract the identity code of the ONU from the optical module, and send the identity code of the ONU. The identity code may be pre-configured by the system on the optical module. The OLT may detect the identity code in the open uplink empty window or the empty timeslot, and if the identity code can be detected, the OLT may determine that the ONU corresponding to the identity code is a rogue ONU.

The following specifically explains a relationship between "authorized time", "unauthorized time", "an open uplink empty window", and "an empty timeslot".

The open uplink empty window refers to a window in which the OLT does not authorize an uplink bandwidth for any ONU, that is, in this empty window, the OLT requires all ONU not to emit light. The empty timeslot is aperture time between two adjacent uplink authorized bandwidths, and each uplink authorized bandwidth is corresponding to authorized time of one ONU. A reason for selecting the open uplink empty window or the empty timeslot as time for detecting the rogue ONU is: if the identity code of the ONU is received within authorized time of a certain ONU, where the identity code of the ONU is sent by the ONU, normal data is overlapped with data that carries the identity code, and the OLT may not identify the identity code in the data; however, in the open uplink empty window or the empty timeslot, an ONU that works properly sends no data, and only a rogue ONU may send data, and therefore, data received by the OLT is data that carries an identity code of a rogue ONU, so that an ONU corresponding to the identity code can be conveniently parsed out.

Figure 2:
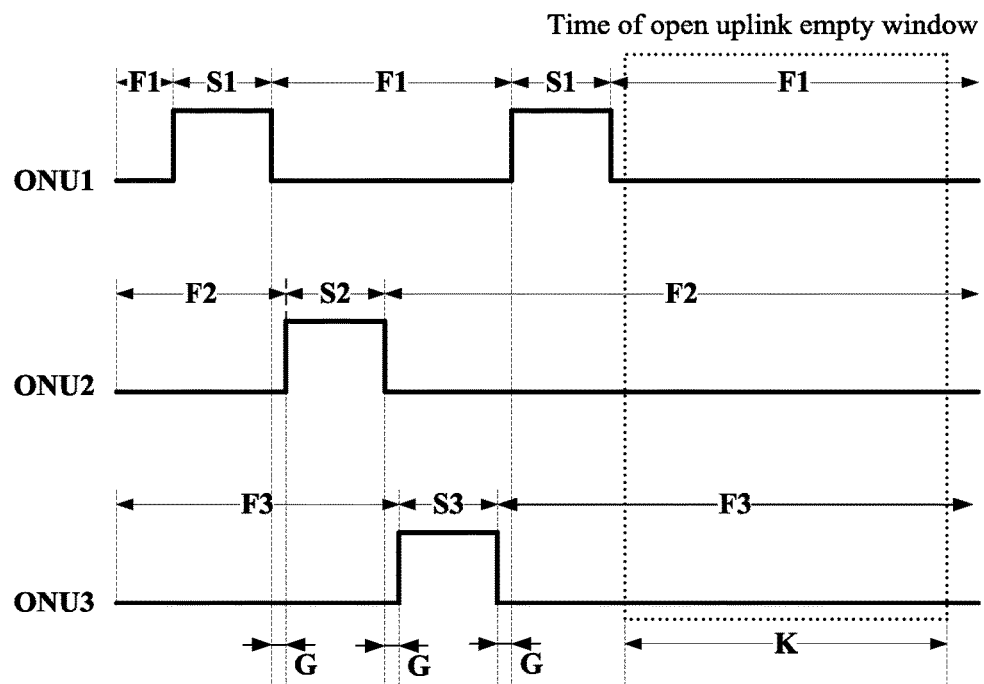
FIG. 2 is a schematic diagram of an open uplink empty window and an empty timeslot according to an embodiment of the present invention.

As shown in FIG. 2, a PON including an OLT and 3 ONUs (ONU1, ONU2, and ONU3) is taken as an example. S1 is authorized time of the ONU1, F1 is unauthorized time of the ONU1, S2 is authorized time of the ONU2, F2 is unauthorized time of the ONU2, S3 is authorized time of the ONU3, F3 is unauthorized time of the ONU3, K is time of an open uplink empty window, and G is an empty timeslot. "Unauthorized time" of the ONU may also be understood as time when a control module (for example, an MAC module) of the ONU sends a non-enable signal to an optical module of the ONU to cause a low level of TX_Enable of the optical module of the ONU.

It can be known from the foregoing explanation that the optical module of the ONU may receive an identity code of the ONU when receiving a "non-enable" signal that is sent by the MAC module, where the identity code of the ONU is sent by the MAC module; or, the optical module of the ONU obtains the identity code that is pre-configured from the optical module of the ONU. When the OLT opens an uplink empty window or an empty timeslot, if a rogue ONU exists, the OLT may detect the identity code of the ONU, and may further determine that an ONU corresponding to the identity code is a rogue ONU. If no data that carries the identity code of the ONU is detected, it is determined that no ONU exists. The detection process does not affect a normal uplink service.

Through the method for detecting an ONU in this embodiment, the identity code of the ONU is detected in the open uplink empty window or the empty timeslot; and according to the identity code of the ONU, the ONU corresponding to the identity code of the ONU is determined as a rogue ONU, so that a rogue ONU is detected and determined quickly and accurately, and therefore, an effect on an uplink service is reduced, and user satisfaction is improved.

Embodiment 2

Figure 3:
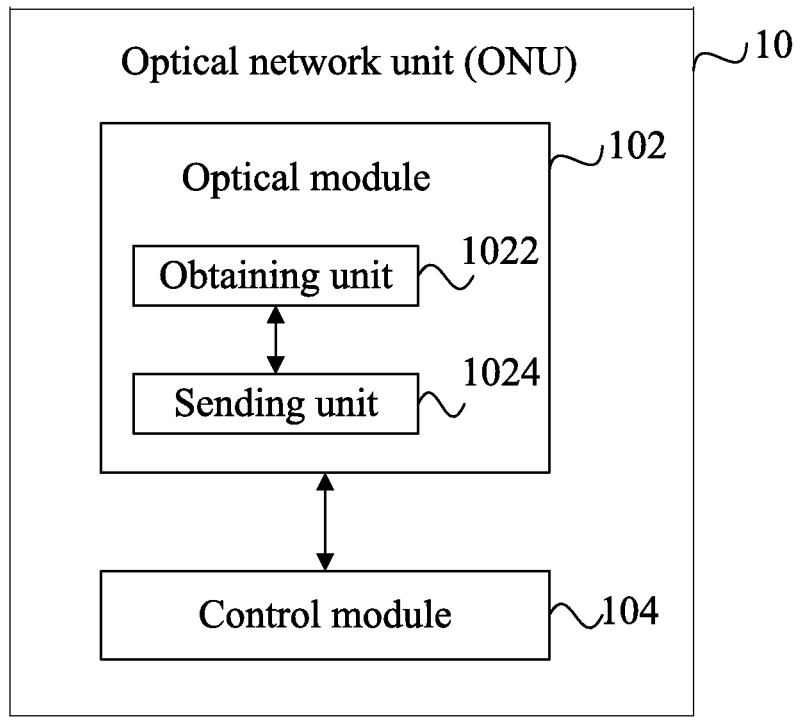
FIG. 3 is a schematic structural diagram of an ONU according to an embodiment of the present invention.

This embodiment provides an optical network unit (ONU) 10. As shown in FIG. 3, the ONU includes an optical module 102, where the optical module 102 includes an obtaining unit 1022, configured to obtain an identity code of an ONU and a sending unit 1024, configured to send the identity code of the ONU, where the identity code of the ONU is obtained by the obtaining unit, so that an OLT can detect the identity code of the ONU in an open uplink empty window or an empty timeslot.

The obtaining unit 1022 obtains the identity code of the ONU in two manners: one is reading the identity code of the ONU from the optical module 102; and the other is obtaining the identity code of the ONU from a control module of the ONU. For the second manner, the ONU may further include a control module 104.

The control module 104 is configured to send a non-enable control signal and the identity code of the ONU to the optical module. The control module 104 may be an MAC chip or an MAC module of the ONU.

The obtaining unit 1022 of the optical module 102 is further configured to receive the non-enable control signal and the identity code of the ONU, where the non-enable control signal and the identity code of the ONU are sent by the control module 104.

For a detailed obtaining process, reference may be made to the description in the first embodiment, which is not described here again.

The identity code of the ONU is a specific sequence optical channel code that identifies the ONU.

Through the ONU in this embodiment, the ONU obtains the identity code of the ONU, and sends the identity code of the ONU, so that if a rogue ONU exists, the OLT can detect the identity code of the ONU in the open uplink empty window or the empty timeslot; and according to the identity code of the ONU, determines an ONU corresponding to the identity code of the ONU as a rogue ONU. In this way, a rogue ONU is detected and determined quickly and accurately, and therefore, an effect on an uplink service is reduced, and user satisfaction is improved.

Embodiment 3

Figure 4:
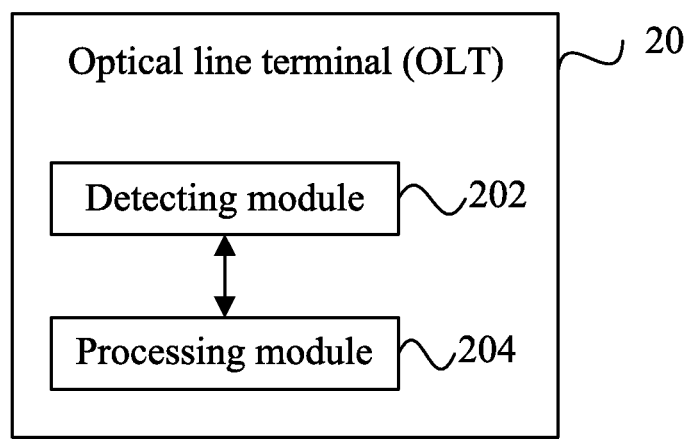
FIG. 4 is a schematic structural diagram of an OLT according to an embodiment of the present invention.

FIG. 4 shows an optical line terminal (OLT) 20. The OLT 20 includes a detecting module 202 and a processing module 204.

The detecting module 202 is configured to, in an open uplink empty window or an empty timeslot of the OLT, detect whether an identity code of an optical network unit (ONU) is received.

The processing module 204 is configured to, when the detecting module detects the identity code of the ONU, determine that an ONU corresponding to the identity code of the ONU is a rogue ONU.

The identity code of the ONU is a specific sequence optical channel code that identifies the ONU.

Through the OLT in this embodiment, if the identity code of the ONU is detected in the open uplink empty window or the empty timeslot, according to the identity code of the ONU, the ONU corresponding to the identity code of the ONU may be determined as a rogue ONU. In this way, a rogue ONU is detected and determined quickly and accurately, and therefore, an effect on an uplink service is reduced, and user satisfaction is improved.

Embodiment 4

Figure 5:
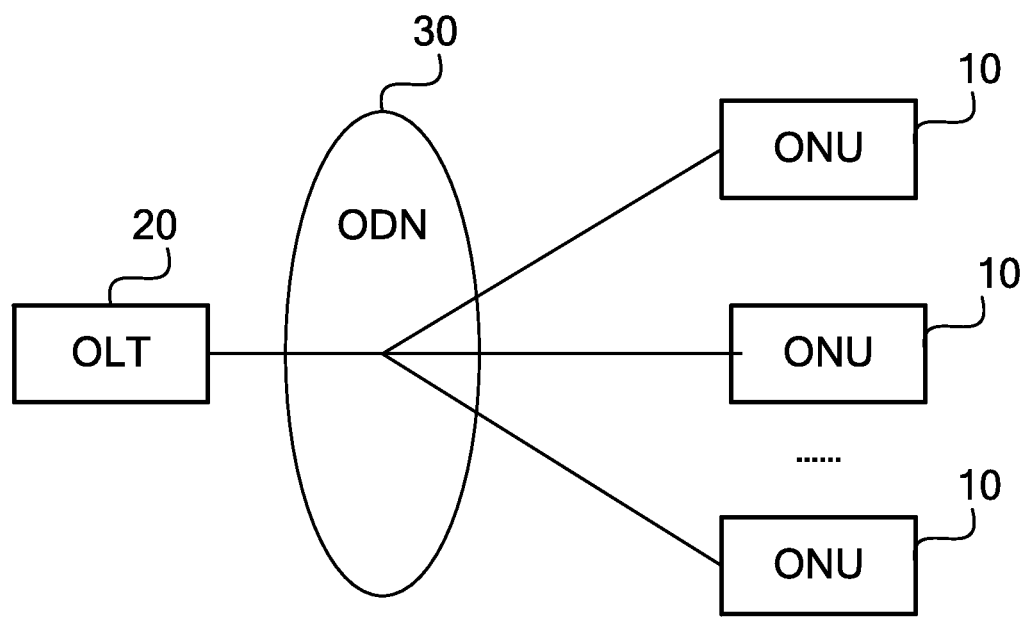
FIG. 5 is a schematic structural diagram of a passive optical network (PON) system according to an embodiment of the present invention.

FIG. 5 shows a passive optical network (PON) system. The system includes an optical line terminal (OLT) 20 and at least one optical network unit (ONU) 10, where the ONU includes an optical module 102 (as shown in FIG. 3).

The optical module 102 is configured to obtain an identity code of an ONU, and send the identity code of the ONU; and The OLT 20 is configured to receive the identity code of the ONU in an open uplink empty window or an empty timeslot, and according to the identity code of the ONU, determine that an ONU corresponding to the identity code of the ONU is a rogue ONU.

The identity code of the ONU is a specific sequence optical channel code that identifies the ONU.

The passive optical network system further includes an optical distribution network (ODN) 30, which includes a trunk fiber, a passive optical splitter, and a branch fiber. The ODN is configured to connect the OLT 20 with the ONU 10. The OLT 20 is connected with the passive optical splitter through the trunk fiber. The optical splitter implements point-to-multipoint optical power distribution, and is connected to multiple ONUs through multiple branch fibers.

The ONU 10 may further include a control module 104 (as shown in FIG. 3), which is configured to send a non-enable control signal and the identity code of the ONU to the optical module. The obtaining unit 1022 of the optical module 102 is further configured to receive the non-enable control signal and the identity code of the ONU, where the non-enable control signal and the identity code of the ONU are sent by the control module 104 (for a detailed function of the ONU 10, reference may be made to the second embodiment).

Through an optical network system in this embodiment, the ONU obtains the identity code of the ONU and sends the identity code of the ONU to the OLT, so that if the identity code of the ONU is detected in the open uplink empty window or the empty timeslot of the OLT, it may be determined that a rogue ONU exists, and according to the identity code of the ONU, the ONU corresponding to the identity code of the ONU may further be determined as a rogue ONU. In this way, a rogue ONU is detected and determined quickly and accurately, and therefore, an effect on an uplink service is reduced, and user satisfaction is improved.

It should be noted that, in this specification, terms like "first" and "second" are only used to differentiate one entity or operation from another, but are not necessarily used to indicate any practical relationship or order between these entities or operations. Moreover, a term such as "include", "contain" or any variation of the term means "including but not limited to". Therefore, a process, method, object, or device that includes a series of elements not only includes these elements, but also includes other elements that are not specified expressly, or may further include inherent elements of the process, method, object or device. In the case that there are no more limitations, in the context of a element that is specified by "include one . . . ", the process, method, object or device that includes a specified element may include other identical elements.

The foregoing descriptions are merely exemplary embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A method for detecting an optical network unit (ONU) in a passive optical network (PON) system including an optical line terminal (OLT) and a plurality of ONUs that communicate with the OLT via a shared optical transmission path, the method comprising:
    detecting an ONU identity code in an open uplink empty window or an empty timeslot, wherein the ONU identity code is a specific sequence optical channel code that identifies a single ONU of the plurality of ONUs included in the PON system during the open uplink empty window or the empty timeslot, the ONU identity code sent if an optical module in the single ONU is faulty; and
    determining that the single ONU corresponding to the ONU identity code is a rogue ONU according to the ONU identity code.

2. The method according to claim 1, wherein the ONU identity code is pre-configured.

3. An optical network unit (ONU) that is one of a plurality of ONUs included in an passive optical network, wherein the plurality of ONUs communicate with an optical line terminal (OLT) via a shared optical transmission path, wherein the ONU comprises:
    an obtaining unit, configured to obtain an ONU identity code, wherein the ONU identity code is a specific sequence optical channel code that uniquely identifies the ONU during an open uplink empty window or an empty timeslot; and
    a sending unit, configured to send the ONU identity code to the OLT in the open uplink empty window or the empty timeslot, the ONU identify code sent if an optical module in the ONU is faulty.

4. The optical network unit according to claim 3, wherein the ONU further comprises a control module, configured to send a non-enable control signal and the ONU identity code to the obtaining unit; and
    wherein the obtaining unit is further configured to receive the control signal and the ONU identity code, wherein the control signal and the ONU identity code are sent by the control module.

5. The optical network unit according to claim 3, wherein:
    the obtaining unit is further configured to read the ONU identity code, wherein the ONU identity code is stored in the optical network unit.

6. An optical line terminal (OLT) in a passive optical network (PON) system that further comprises a plurality of optical network units (ONUs) that communicate with the OLT via a shared optical transmission path, wherein the OLT comprises:
    a detecting module, configured to detect whether an ONU identity code is received in an open uplink empty window or empty timeslot of the OLT, wherein the ONU identity code is a specific sequence optical channel code that identifies a single ONU of the plurality of ONUs included in the PON system during the open uplink empty window or the empty timeslot, the ONU identity code sent if an optical module in the single ONU is faulty; and
    a processing module, configured to determine that the single ONU corresponding to the ONU identity code is a rogue ONU.

7. A passive optical network system comprising:
    an optical line terminal (OLT); and
    a plurality of optical network units (ONUs) that communicate with the OLT via a shared optical transmission path;
    wherein the OLT is configured to:
        receive an ONU identity code sent by one of the plurality of ONUs in an open uplink empty window or an empty timeslot, the ONU identity code sent if an optical module in the one of the plurality of ONUs is faulty, wherein the ONU identity code is a specific sequence optical channel code that identifies the ONU during the open uplink empty window or the empty timeslot; and
        determine that the ONU corresponding to the ONU identity code is a rogue ONU according to the identity code of the ONU.

* * * * *